United States Patent [19]

Babiec, Jr. et al.

[11] 4,048,107
[45] Sept. 13, 1977

[54] POLYURETHANE FOAM PREPARATION USING AMIO ACETAL CATALYST

[75] Inventors: John S. Babiec, Jr., Orange; Steven T. Nakos, Wallingford; Stephen L. Goldstein, Cheshire, all of Conn.

[73] Assignee: Olin Corporation, New Haven, Conn.

[21] Appl. No.: 648,451

[22] Filed: Jan. 12, 1976

[51] Int. Cl.$^2$ ............................................. C08G 18/18
[52] U.S. Cl. ........................ 260/2.5 AC; 260/77.5 AC
[58] Field of Search ................... 260/2.5 AC, 77.5 AC

[56] References Cited

U.S. PATENT DOCUMENTS

| | | | |
|---|---|---|---|
| 2,941,967 | 6/1960 | Moller | 260/2.5 AC |
| 3,330,782 | 7/1967 | Poppelsdorf | 260/2.5 AC |
| 3,694,510 | 9/1972 | Moller | 260/2.5 AC |
| 3,786,029 | 1/1974 | Bechara | 260/77.5 AC |
| 3,817,997 | 6/1974 | Carlson | 260/2.5 AC |
| 3,890,255 | 6/1975 | Van Leuwen | 260/2.5 AC |

OTHER PUBLICATIONS

Thiokol Chemical Intermediates, TD. No. 1755; CI--710, bis(2-dimethylamino ethyl) formal; Apr. 1, 1975; 8 pages; Thiokol Chemical Corp., Trenton N.J.

*Primary Examiner*—C. Warren Ivy
*Attorney, Agent, or Firm*—F. A. Iskander; T. P. O'Day

[57] ABSTRACT

Selected amines are used as catalysts in the preparation of polyurethane foam.

17 Claims, No Drawings

POLYURETHANE FOAM PREPARATION USING AMID ACETAL CATALYST

This invention relates to a select group of amine compounds and to their use as catalysts in th preparation of polyurethane foam.

The production of polyurethane foams is achieved by reacting organic polyisocyanates with active hydrogen-containing compounds in the presence of a foaming agent. Usually a catalyst is employed to promote or effect the reaction. It is known in this art that all tertiary amines exert some catalytic activity, although the level of such activity varies considerably depending on the particular tertiary amine that is used.

Further in this art, certain tertiary amines, containing aliphatically-bound oxygens in the molecule, have been identified for use in catalyzing the polyurethane form-forming reaction. Various such catalysts are described in U.S. Pat. Nos. 2,941,967, 3,330,782 and 3,786,029. As pertain to the compounds disclosed herein, noteworthy of these prior art catalysts are 1,2-(2-dimethylaminoethoxy)ethane, 1,1,1,-tris(2-dimethylaminoethoxy)ethane, and bis(2-dimethylaminoethyl)ether. The latter material has been widely used in the commercial production of polyurethanes. See also U.S. Pat. No. 2,560,280, which discloses various formals, including for example bis(2-dimethylaminoethoxy)methane, for use as intermediates in the preparation of bactericides.

However, those oxygen-containing amino compounds which have been used, according to the prior art, to catalyze the polyurethane foam-forming reaction are difficult to prepare; and due to the high cost of materials used in their preparation, they are relatively quite expensive. Consequently, their use, though in small or catalytic amounts, adds considerably to the cost of producing polyurethane foam.

It is primary object of the invention to provide an improvement in the polyurethane foam catalytic art. A more specific object is to provide a new group of amine catalysts which, along with being highly effective in promoting the polyurethane foam-forming reaction, are simple to prepare and represent a substantial cost reduction over prior art catalysts. Another object is to prepare polyurethane foams which, by virtue of the catalysts used, have improved physical properties.

The achievement of the above objects according to the invention is based on the discovery of selected amino ethers, as identified in more detail hereinbelow, which are generally encompassed by formula I as follows:

$$(R_2NXO)_mZ(OXNR_2)_n \qquad I$$

wherein

Z is a hydrocarbon radical of 1–12 carbon atoms,

X is an aliphatic hydrocarbon radical of 2–4 carbon atoms,

R is methyl, ethyl or the radical $NR_2$ is morpholino, m is an integer of 0–2, and n is an integer of 1 or 2, with the proviso that when n is 1, m is also 1 and when n is 2, m is 0 or 2.

Further according to the invention, the amino ethers described herein are used to advantage as catalysts in the production of polyurethane foam.

More in detail the amino ethers of the invention include the following:

bis (2-dimethylaminoethoxy)methane,
bis(1-dimethylamino-2-propoxy)methane,
1,6-bis(2-dimethylaminoethoxy)hexane,
α, α'-bis(2-dimethylaminoethoxy)-p-xylene,
bis(3-dimethylamino-1-propoxy)methane,
2,6-bis(2-dimethylaminoethoxy)pyridine,
2,6-bis(1-dimethylamino-2-propoxy)pyridine,
2,6-bis(3-dimethylamino-1-propoxy)pyridine,
bis(2dimethylaminoethoxy)methane,
bis(2-N-morpholinoethoxy)methane,
1,1-bis(2-dimethylaminoethoxy)propane,
2,2-bis(2-dimethylaminoethoxy)propane,
α, α'-bis(2-dimethylaminoethoxy)toluene,
1,1-bis(2-dimethylaminoethoxy)butane,
1,1-bis(2-dimethylaminoethoxy)ethane, and
1,1,2,2-tetrakis(2-dimethylaminoethoxy)ethane. mono- and 

The preferred amino ethers for use according to the invention are the mono- and diacetals, i.e., compounds of formula I above wherein n is 2 and m is either 0 or 2. Particularly preferred such compounds are those selected from the group consisting of 1,1-bis(2-dimethylaminoethoxy)ethane; bis(2-dimethylaminoethoxy)methane; 1,1-bis(2-dimethylaminoethoxy)propane and 1,1,2,2-tetrakis(2-dimethylaminoethoxy)ethane. These amino acetals, along with their relative low cost of preparation, have the added advantage that, when used to catalyze the polyurethane foam-forming reaction, yield a foam product having improved load bearing properties. In this regard, the most preferred catalysts are 1,1-bis(2-dimethylaminoethoxy)ethane and bis(2-dimethylaminoethoxy)methane.

The preferred amino ethers of the invention can be prepared by a relatively simple, two-step process using readily available, relatively inexpensive starting materials. For example, in the case of the compounds 1,1-bis(2-dimethylaminoethoxy)ethane, bis(2-dimethylaminoethoxy)methane and 1,1-bis(2-dimethylaminoethoxy)propane, this process involves (1) reacting 2 moles of chloroethanol with one mole of aldehyde to form an acetal intermediate, and then (2) reacting one mole of this intermediate with two moles of dimethylamine. The two reactions are illustrated by the following equations wherein Z represents hydrogen, a methyl group or an ethyl group:

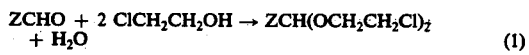

The first reaction (1) is carried out at room temperature in the presence of an acidic catalyst such as magnesium sulfate which also acts to absorb the by-product water that is formed. The magnesium sulfate is then removed by filtration. The second reaction (2) is effected at elevated temperatures, e.g., 100° C, and in a closed reaction vessel. One equivalent of sodium hydroxide per every amine nitrogen present is added to the reaction mixture, the sodium hydroxide thus reacting with the by-product hydrochloric acid to form sodium chloride and water. The water is then evaporated out and the sodium chloride filtered off. Desirably, the recovered amino ether product is finally purified by distillation before it is used as a catalyst according to the invention.

An alternative method of preparation comprises (1) reacting an amino alcohol, e.g., 2-dimethylaminoethanol, with an alkali metal, e.g., sodium, to form an alkali metal alcoholate and then (2) reacting the latter with an alkylene halide, e.g., methylene chloride.

With respect to the other preferred amino ether, namely, the diacetal 1,1,2,2,-tetrakis(2-dimethylaminoethoxy)ethane, the two-step process for its preparation involves (1) reacting one mole of glyoxal with 4 moles of chloroethanol to form a diacetal intermediate and then (2) reacting one mole of this intermediate with 4 moles of dimethylamine. These reactions are illustrated by the following equations:

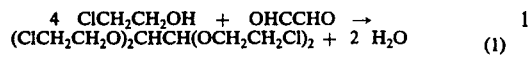

(1)

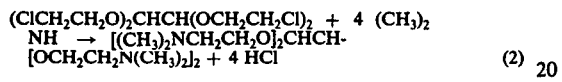

(2)

In the first reaction (1), the glyoxal is usually supplied and used as a solution thereof in water. Removal of this water, as well as the water which is formed as a by-product, is achieved azeotropically by carrying out the reaction under reflux, using a Dean-Stark trap, and in the presence of a suitable organic solvent, e.g., toluene, carbon tetrachloride or benzene. Additionally, the reaction is effected in the presence of an acidic catalyst, such as sulfuric acid. The acid catalyst is then neutralized with aqueous sodium bicarbonate, the aqueous layer being removed by phase separation. The intermediate diacetal product is finally freed of benzene and any excess chloroethanol that is present by distillation.

The same reaction (2) is carried out using essentially the same procedure and conditions as described above in connection with the second reaction for preparing the other preferred amino ethers.

In accordance with the process of the invention, the amino ethers disclosed herein are used as catalysts in the preparation of polyurethane foams. Either the one-shot method or the prepolymer techniques may be employed in preparing the foam which may be flexible, rigid or semi-rigid. The foam is prepared from a reaction mixture comprising, in addition to the amino ether catalyst, as described above, a compound having at least two active hydrogens in the molecule, an organic polyisocyanate, and a foaming agent. A variety of such reactants, including mixtures thereof, are known in the art. For example, illustrative organic polyisocyanates include toluene diisocyanate, such as the 4:1 and 65:35 mixtures of the 2,4- and 2,6-isomers, methylene-bis(4-phenylisocyanate), 1,5-naphthalene diisocyante, 1,3-phenylene diisocyanate, the xylylene diisocyanates, 3,3'-bitoluene diisocyanate, the polymethylene polyphenylisocyanates, hexamethylene diisocyanate, propylene diisocyanate, mixtures thereof and the like. In practice, certain aliphatic-aromatic polyisocyanates, such as toluene diisocyanate, he polymethylene polyphenylisocyanates and mixtures thereof are preferred due to the fact that these materials are readily available commercially and have gained wide acceptance for use in the production of polyurethane foams.

The compound having at least two active hydrogens in the molecule can be any such material, including mixtures thereof, which reacts with polyisocyanates to form polyurethanes. Illustrative are the polyols, including the polyester polyols and the polyether polyols, as taught by the prior art. In general, the use of polyether polyols is preferred.

The polyether polyols include for example oxyalkylated polyhydric alcohols and mixtures thereof. These oxyalkylated polyhydric alcohols usually have 2–8 hydroxyl groups and a molecular weight ranging from about 200 to about 10,000 and preferably about 250–8,000. The oxyalkylated polyhydric alcohols are generally prepared by methods well-known in the art such as reacting, in the presence of an oxyalkylation catalyst, a polyhydric alcohol and an alkylene oxide such as ethylene oxide, propylene oxide, butylene oxide, amylene oxide, epichlorohydrin, and mixtures of these alkylene oxides, using either random or step-wise addition.

Polyhydric alcohols suitable for use in preparing the polyether polyols include for example ethylene glycol, propylene glycol, 2,3-butylene glycol, 1,3-butylene glycol, 1,5-pentane diol, 1,6-hexane diol, glycerol, trimethylolpropane, pentaerythritol, sorbitol, methyl glucoside, sucrose, dextrose, mixtures thereof and the like. If desired, a portion of the polyhydric alcohol may be replaced with another compound having at lest two reactive hydrogen atoms, such as alkyl amines, alkylene polyamines, cyclic amines, amides, and polycarboxylic acids. Mixtures of oxyalkylated polyhydric alcohols are also suitable for use in the process of this invention.

Although as indicated above, the polyurethane foams of the invention can be flexible, semi-rigid, or rigid, the flexible foams are preferred. Such foams are obtained utilizing polyols which range in molecular weight from about 2,000 to 7,000 and still more preferably from about 2,500 to about 6,000.

Such relative proportions of organic polyisocyanate and polyol are used as to provide at least about 0.7, and preferably about 0.9–1.20, NCO groups per every OH group which is present in the foam forming reaction mixtures.

The polyurethane foams are prepared in the presence of a foaming agent which may be any of those known to be useful for this purpose. Illustrative are water and the organic foaming agents containing up to about seven carbon atoms such as the halogenated hydrocarbons, lower molecular weight alkanes, alkenes, ethers, and mixtures thereof. In general, water and the halogenated hydrocarbons are the preferred foaming agents. Typical halogenated hydrocarbons include, for example, monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. The amount of foaming agent employed may be varied within a wide range. For illustration, the halogenated hydrocarbons may be employed in an amount from about 1 to about 50, and preferably about 5–35, parts per 100 parts by weight of the polyol; and water may be employed in an amount from about 1.0 to about 6.0 parts per 100 parts by weight of the polyol.

It is preferred in the preparation of th polyurethane foam of the present invention to employ minor amounts of a conventional surfactant in order to improve the cell structure of the polyurethane foam. Typical of such surfactants are the silicones, and the siloxaneoxyalkylene block copolymers. U.S. Pat. No. 3,834,748 and T. H. Ferrigno, Rigid Plastic Foams (New York: Reinhold Publishing Corp., 1963) pages 38–42, disclose various surfactants which are useful for this purpose. Generally up to 2 parts by weight of the surfactant are employed per 100 parts of the polyol.

If desired, the foam-forming reaction mixture may include additional ingredients which serve a certain function or impart a specific property of the foam. This includes, for example, fillers, colorants, plasticizers, fire-retardant additives, and so forth.

In carrying out the polyurethane foam-forming reaction, the amino ether catalysts of the invention may be used alone, i.e., as the sole catalysts, or in combination with other catalysts. In practice the use of a metallic co-catalyst is prescribed when preparing flexible foams, whereas such co-catalysts are generally unnecessary when preparing rigid foams. The metallic co-catalysts include, for example, the organo-tin compounds. U.S. Pat. No. 3,330,782 which issued to F. Poppelsdorf on July 11, 1967 describes various such organo-tin catalysts. The entire disclosure of this Poppelsdorf patent is incorporated herein by reference. Particularly preferred organo-tin catalysts for use herein are the stannous salts such as stannous octoate, stannous laurate, stannous oleate, stannous acetate and the like, stannous octoate being most preferred.

The catalyst, be it a single amino ether as disclosed herein or a combination thereof with other catalysts, may be used in any suitable proportion which is effective in catalyzing the polyurethane foam-forming reaction. Thus the term "catalytic proportion", as used in the specification and claims herein, is intended to encompass any such proportion. For illustration, the catalytic proportion may range from about 0.01 to about 6, and more commonly about 0.05-3, parts per every 100 parts by weight of the polyol.

The amino ethers of the invention exhibit a high level of activity in catalyzing the polyurethane foam-forming reaction. Additionally, they can be prepared from readily available starting materials and at a substantially reduced cost as compared with similar prior art catalysts.

Furthermore, the use of some of the amino ether catalysts described above in the production of polyurethane foam has the added advantage of improving the physical properties of the resulting foam. Specifically, it has been found that flexible polyurethane foam that are prepared in the presence of these catalysts have improved load bearing properties. This desirable and rather surprising phenomenon, the nature of which is not yet fully understood, is demonstrated in the examples below.

Polyurethane foams prepared by the process of the invention are of utility in a wide range of industrial and commercial applications. For example, the flexible foams are useful in various cushioning and similar applications such as the production of carpet underlays, seat cushions, mattresses, gaskets and so forth. Similarly the rigid polyurethane foams find utility in various insulation and structural applications.

The following examples are provided to illustrate the invention. All parts and percentages given in these exampls are by weight unless otherwise specified. Examples 1-4 illustrate the preparation of various amino ether catalysts of the invention; the remaining examples, as well as the comparisons, are directed to the preparation of polyurethane foam. It is to be noted that whereas in Examples 5-18 laboratory hand-mixing and foaming procedures were used, Examples 19-26 and Comparisons 1-8 represent machine foaming runs.

EXAMPLE 1

Bis(2-dimethylaminoethoxy)methane

The amount of 29.6 grams of sodium was added and mixed with a solution of 150 grams (1.68 moles) of 2-dimethylaminoethanol in 300 mls. of dry toluene. The mixture was refluxed until all the sodium was reacted with the 2-dimethylaminoethanol forming sodium 2-dimethylaminoethoxide. The system was then cooled to 50° C and 54.4 grams (0.64 mole) of methylene chloride were added. This mixture was refluxed for 6 hours. The precipitated sodium chloride was removed by filtration, and the filtrate was fractionally distilled to remove first the toluene and excess 2-dimethylaminoethanol and then the substantially pure reaction product, namely, bis(2-dimethylaminoethoxy)methane. This product, weighing 59.8 grams, was a colorless liquid boiling at 73° C and 1.4 m.m. of mercury pressure. The identity of the product was confrimed by elemental analysis as follows:

|  | % Carbon | % Hydrogen | % NItrogen |
| --- | --- | --- | --- |
| Calculated: | 56.80 | 11.65 | 14.72 |
| Found: | 56.85 | 11.64 | 14.80 |

The structure of the compound bis(2-dimethylaminoethoxy)methane in the product was further confirmed by nuclear magnetic resonance (NMR).

EXAMPLE 2

1,1-bis(2-dimethylaminoethoxy)ethane

The amount of 81.8 mls. of acetaldehyde was added slowly to a one-liter, round-bottom flask containing a mixture of 241.5 grams of 2-chloroethanol and 50 grams of anhydrous magnesium sulfate. The flask was stoppered, manually shaken for 2 minutes, and thereafter stirred mechanically for a period of 66 hours. The magnesium sulfate was removed by filtration and the volatiles in the filtrate were removed by rotary evaporation at 15 m.m. of mercury. The crude product thus obtained was then distilled at 63° C and 1.8 m.m. of mercury, yielding 178.5 grams of 1,1-bis(2-chloroethoxy)ethane. This was mixed with 645 grams of an aqueous 40% solution of dimethylamine to which had been added 76.4 grams of sodium hydroxide. The mixture was heated to 110° C, with continuous stirring, in a stainless steel autoclave. After 4 hours in the autoclave, the mixture was cooled and subjected to rotary evaporation in order to remove the excess dimethylamine and most of the water. Precipitated sodium chloride was removed by filtration and washed with 100 mls. of benzene, the latter being added to the filtrate. The remaining aqueous layer in the combined filtrate ws removed by phase separation. Finally the non-aqueous layer was distilled to remove first the benzene and then the acetal product. The latter weighed 145.5 grams, and the identity of 1,1-bis(2-dimethylaminoethoxy)ethane was confirmed by elemental analysis as follows:

|  | % Carbon | % Hydrogen | % Nitrogen |
| --- | --- | --- | --- |
| Calculated: | 59.08 | 11.40 | 13.78 |
| Found: | 58.89 | 11.46 | 13.57 |

EXAMPLE 3

1,1,2,2-tetrakis(2-dimethylaminoethoxy)ethane

The amount of 200 grams (2.48 moles) of 2-chloroethanol was mixed with 300 mls. of toluene, 72.5 grams (0.50 mole) of a 40% aqueous glyoxal solution, and 2 mls. of sulfuric acid. The mixture was refluxed with continuous removal of water and solvent recirculation. When the water removal was complete, the toluene was distilled off. The remaining residue was washed with 150 mls. of 10% aqueous sodium bicarbonate, dried and distilled at 145° C and 0.03 m.m. of mercury pressure, thereby yielding 92 grams of 1,1,2,2-tetrakis(2-chloroethoxy)ethane. 80 grams of this were then added to an ice-cold mixture consisting of 353 grams of 40% aqueous dimethylamine and 42 grams of sodium hydroxide. The system was heated for 4 hours at 110° C. Thereafter, it was cooled to room temperature and the water was removed by rotary evaporation. The precipitated salts were removed by filtration and by washing with ethanol. Distillation of the combined filtrates gave 61.2 grams of substantially pure product, namely, 1,1,2,2-tetrakis(2-dimethylaminoethoxy)ethane. This had a boiling point of 144°–146° C at 0.05 m.m. of mercury, and its structure was confirmed by NMR.

EXAMPLE 4

2,6-bis(2-dimethylaminoethoxy)pyridine

Sodium 2-dimethylaminoethoxide was prepared in the manner described in Example 1. Powdered 2,6-dichloropyridine was then added slowly to the cooled mixture. The system was heated slowly at first, followed by a 16-hour reflux. After cooling and subsequent removal of precipitated sodium chloride, the filtrate was stripped of solvent, 133 grams of yellowish liquid product, namely, 2,6-bis(2-dimethylaminoethoxy)pyridine, were then recovered by distillation at 105°–109° and 0.1 m.m. of mercury. The structure of the product was confirmed by NMR.

EXAMPLE 5

Polyurethane Foam Preparation

A flexible polyurethane foam was prepared from the ingredients described below including 0.07 grams (0.84 amine equivalent) of bis(2-dimethylaminoethoxy)methane.

| Ingredients | Parts by Weight |
|---|---|
| Oxypropylated glycerin, mol. wt. 3,000 | 100.0 |
| Toluene diisocyanate(80/20 mixture of 2,4-/2,6-isomers) | 49.6 |
| Water | 2.5 |
| Stannous octoate | 0.2 |
| Bis(2-dimethylaminoethoxy)methane | 0.07 |
| Silicon Surfactant (Dow Corning-192) | 1.5 |

The above mixture was hand mixed at room temperature and immediately poured into an open-top, square cardboard box. Using a stop-watch, the "cream-time," "rise time" and "gel time" were measured, all being from the moment the mixture is placed into the box. The "cream-time" is the time elapsed, up to the point when foaming commences, during which the mixture is transformed from a liquid to a cream or emulsion. The "rise-time" is the time elapsed for completion of the foaming reaction or expansion of the foam. This is usually evidenced by the appearance of gas bubbles on the surface of the foam. The "gel time" is the time elasped for the resulting foam to become a self-supporting body as evidenced by the foam exhibiting resistance to being penetrated by a dull instrument. The results of these measurements are provided in Table I below.

On visual examination, the foam had a regular or uniform cell structure.

EXAMPLES 6–18

Preparation of Polyurethane Foam

In these examples, the identical procedure of Example 5 was followed except for variations in the amino ether catalyst used. Thus instead of 0.07 gram of bis(2-dimethylaminoethoxy)methane, the following materials were employed in the indicated proportions:

Ex. 6: bis(1-dimethylamino-2-propoxy)methane—0.10 gram (1.05 amine equiv.).

Ex. 7: 1,6-bis(2-dimethylaminoethoxy)hexane—0.11 gram (0.97 amine equiv.).

Ex. 8: α, α'-bis(2-dimethylaminoethoxy)-p-xylene—0.18 gram (1.47 amine equiv.).

Ex. 9: bis(3-dimethylaminopropoxy)methane—0.10 gram (1.05 amine equiv.).

Ex. 10: 2,6-bis(2-dimethylaminoethoxy)-pyridine—0.12 gram (1.08 amine equiv.).

Ex. 11: 2,6-bis(1-dimethylamino-2propoxy)-pyridine—0.17 gram (1.42 amine equiv.).

Ex. 12: 2,6-bis(3-dimethylaminopropoxy)-pyridine—0.13 gram (1.10 amine equiv.).

Ex. 13: bis(2-dimethylaminoethoxy(methane—0.15 gram (1.44 amine equiv.).

Ex. 14: bis(2-N-morpholinoethoxy)methane—0.25 gram (2.08 amine equiv.).

Ex. 15: 1,1-bis(2-dimethylaminoethoxy(-propane—0.11 gram (1.15 amine equiv.).

Ex. 16: α, α-bis(2-dimethylaminoethoxy)-toluene—0.13 gram (1.12 amine equiv.).

Ex. 17: 1,1-bis(2-dimethylaminoethoxy)ethane—0.09 gram (1.00 amine equiv.).

Ex. 18: 1,1,2,2-tetrakis (2-dimethylaminoethoxy)ethane—0.12 gram (1.45 amine equiv.).

In the case of each of Examples 6–18, the resulting foam was a wholesome product having a regular cell structure. The results of the time measurements for these examples are provided in Table I below.

Table I

| Example No. | Catalyst Amine Equiv. | Time Measurements (sec.) | | |
|---|---|---|---|---|
| | | Cream | Rise | Gel |
| 5 | 0.84 | 11 | 138 | 148 |
| 6 | 1.05 | 12 | 147 | 152 |
| 7 | 0.97 | 12 | 148 | 156 |
| 8 | 1.47 | 11 | 155 | 162 |
| 9 | 1.05 | 10 | 135 | 142 |
| 10 | 1.08 | 10 | 129 | 138 |
| 11 | 1.42 | 10 | 141 | 154 |
| 12 | 1.10 | 10 | 143 | 153 |
| 13 | 1.44 | 10 | 131 | 140 |
| 14 | 2.08 | 12 | 178 | 190 |
| 15 | 1.15 | 11 | 139 | 148 |
| 16 | 1.12 | 11 | 145 | 154 |
| 17 | 1.00 | 11 | 124 | 138 |
| 18 | 1.45 | 11 | 135 | 146 |

EXAMPLE 19

Using a foaming machine, four polyurethane foam samples were prepared which are identified as E-19A; E-19B; E-19C and E-19D. In preparing these samples, the formulation of Example 5 was used except for the following modifications. First, instead of 2.5 parts of water, 4.0 parts were used. Secondly, the amounts of catalysts used were varied. Thus in E-19A 0.10 gram of bis(2-dimethylaminoethoxy)methane and 0.25 gram of stannous octoate were used; in E-19B, 0.10 gram of bis(2-dimethylaminoethoxy(methane and 0.275 gram of stannous octoate were used; in E-19C, 0.07 gram of bis(2-dimethylaminoethoxy)methane and 0.25 gram of stannous octoate were used; and in E-19D, 0.07 gram of bis(2-dimethylaminoethoxy) methane and 0.275 gram of stannous octoate were used. Each of the four foams was tested for its indentation load deflection, at 25% deflection and 65% deflection, following the procedure described in ASTM D-1564-64T. The results of the tests are provided in Table II below, wherein the bis(2-dimethylaminoethoxy)methane catalyst is referred to as "No. 19".

EXAMPLE 20

The identical procedure of Example 19 was repeated in preparing four foam samples identified as E-20A, E-20B, E-20C and E-20D. In preparing these foams, however, instead of bis(2-dimethlaminoethoxy) methane another amino acetal catalyst of the invention was used, namely, 1,1-bis(2-dimethylaminoethoxy)ethane. The results of the tests are provided in Table II, wherein the 1,1-bis(2-dimethylaminoethoxy)ethane catalyst is referred to as "No. 20".

Comparison 1

Again the procedure of Example 19 was followed using, instead of the bis(2-dimethylaminoethoxy(methane, a prior art catalyst, namely, bis(2-dimethylaminoethyl)ether. The foam samples were identified as C-1A, C-1B, C-1C, and C-1D. The results of the indentation load deflection tests for this comparison are provided in Table II wherein the bis(2-dimethylaminoethyl)ether is referred to as "C-1".

Comparison 2

This represents a further repetition of Example 19, using, instead of bis(2-dimethylaminoethoxy)methane, another prior art material, namely, 1,2-bis(2-dimethylaminoethoxy)ethane. The foam samples were identified as C-2A, C-2B, C-2C, and C-2D. The results of the indentation load deflection tests on these samples are provided in Table II wherein the 1,2-bis(2-dimethylaminoethoxy) ethane is referred to as "C-2".

when utilizing the preferred amino ether catalysts of the invention.

EXAMPLE 21

A polyurethane foam was prepared using a foaming machine and the basic formulation of Example 19. Here, however, the catalyst used consisted of 0.10 part of bis(2-dimethylaminoethoxy)methane and 0.30 part of stannous octoate. The indentation load deflection properties of the resulting foam were measured as per ASTM D-1564-64T. The results are provided in Table III below.

Comparisons 3-4

The identical procedure of Example 21 was followed except that instead of the bis(2-dimethylaminoethoxy)methane, prior art amine catalysts were used. Thus in Comparison 3, the amine catalyst was a commercial product, purchased under the trademark "NIAX A-1", described as consisting of 70% bis(2-dimethylaminoethoxy)ether and 30% dipropylene glycol; and in Comparison 4 another commercial product was used. This product, purchased under the trademark "DABCO 33LV" is described as consisting of ⅓triethylene diamine, and ⅔dipropylene glycol. The results of these comparisons are provided in Table III.

Example 22

Again the identical procedure of Example 21 was followed except that here 0.275, rather than 0.30 part of stannous octoate was used. Also instead of bis(2-dimethylaminoethoxy)methane, 1,1-bis(2-dimethylaminoethoxy)ethane was used. The results are provided in Table III.

Comparisons 5-6

These comparisons were duplicates of Example 22 except that in lieu of the 1,1-bis(2-dimethylaminoethoxy)ethane, the catalysts used in Comparisons 5 and 6 were the same commercial products used in Comparisons 3 and 4, respectively. The results are provided in Table III.

Table II

| Samples | Catalyst/gms. | Stann. Octoate | Indentation Load Defl. (lbs)* | |
|---|---|---|---|---|
| | | | at 25% Defl. | at 65% Defl. |
| E-19A | No. 19/0.1 | 0.25 | 34.1 | 66.6 |
| E-20A | No. 20/0.1 | 0.25 | 33.0 | 64.1 |
| C-1A | C-1/0.1 | 0.25 | 31.8 | 61.5 |
| C-2A | C-2/0.1 | 0.25 | 31.3 | 61.8 |
| E-19B | No. 19/0.1 | 0.275 | 34.9 | 68.5 |
| E-20B | No. 20/0.1 | 0.275 | 34.2 | 67.7 |
| C-1B | C-1/0.1 | 0.275 | 32.7 | 62.9 |
| C-2B | C-2/0.1 | 0.275 | 32.0 | 62.8 |
| E-19C | No. 19/0.07 | 0.25 | 34.9 | 70.35 |
| E-20C | No. 20/0.07 | 0.25 | 34.5 | 68.6 |
| C-1C | C-1/0.07 | 0.25 | 33.9 | 65.1 |
| C-2C | C-2/0.07 | 0.25 | 32.0 | 62.2 |
| E-19D | No. 19/0.07 | 0.275 | 35.4 | 71.2 |
| E-20D | No. 20/0.07 | 0.275 | 35.4 | 70.7 |
| C-1D | C-1/0.07 | 0.275 | 35.9 | 68.2 |
| C-2D | C-2/0.07 | 0.275 | 31.9 | 62.7 |

*Per ASTM D-1564-64T.

The data in Table II demonstrates that improved load bearing properties, as measured in terms of the indentation load deflection (ILD), are realized in the foam Table III

| Example or Comparison | Indentation Load Defl. (lbs.) | |
|---|---|---|
| | at 25% Defl. | at 65% Defl. |
| Example 21 | 29.5 | 59.3 |
| Comparison 3 | 28.5 | 55.8 |
| Comparison 4 | 25.2 | 50.8 |
| Example 22 | 31.0 | 60.6 |
| Comparison 5 | 25.9 | 51.5 |
| Comparison 6 | 25.2 | 50.7 |

The data in Table III demonstrates the improvement in indentation load deflection properties which results from using the catalysts of the invention as compared with using the prior art catalysts.

EXAMPLES 23-24

The procedure of Example 21 was followed in preparing two foams which are identified as E-23 and E-24. Here, however, the catalyst composition was different. Thus 0.08 part of bis(2-dimethylaminoethoxy)methane was used in both examples. Also, the stannous octoate level used in preparing E-23 was 0.25 part and in preparing E-24, 0.275 part. The cream time, rise time and gel time for each example were measured, as well as the indentation load deflection properties of the resulting foam. The results are provided in Table IV below.

EXAMPLES 25-26

Two foams, identified as E-25 and E-26, were prepared exactly as in Examples 23 and 24, respectively, except that in lieu of the bis(2-dimethylaminoethoxy)methane, the amino ether catalyst used in both Examples 25 and 26 was 1,1-bis(2-dimethylaminoethoxy) ethane. The results of the two examples are provided in Table IV below.

Comparisons 7-8

For comparison purposes, two foams, identified as C-7 and C-8, were prepared again using the identical procedure of Example 23 and 24, respectively. Here, however, the commercial amine catalyst NIAX A-1 was employed. The results of these comparisons are provided in Table IV below.

Table IV

| Samples | Time Measurements Sec. | | | Indentation Load Defl. (lbs.)* | |
|---|---|---|---|---|---|
| | Cream | Rise | Gel | at 25% Defl. | at 65% Defl. |
| E-23 | 15 | 101 | 107 | 28.1 | 58.4 |
| E-25 | 14 | 105 | 110 | 32.2 | 62.0 |
| C-7 | 14 | 104 | 108 | 28.4 | 55.1 |
| E-24 | 13 | 97 | 102 | 29.2 | 59.5 |
| E-26 | 16 | 99 | 105 | 32.2 | 62.1 |
| C-8 | 14 | 99 | 102 | 28.4 | 55.5 |

*per ASTM D-1564-64T.

The data in Table III demonstrates that whereas the catalyst activity of the two catalysts of the invention and that of a similar prior art catalyst are essentially the same, there is a noticeable difference in the indentation load deflection properties of the resulting foams. Thus higher values are obtained in the foams of the invention as a result of using the indicated amino ether catalysts as compared with using the prior art catalyst.

What is claimed is:

1. A process for preparing a polyurethane foam from a reaction mixture which comprises an organic polyisocyanate, a polyol, a foaming agent and a catalytic proportion of an amino acetal catalyst selected from the group consisting of:
    1,1-bis(2-dimethylaminoethoxy)ethane,
    bis(2-dimethylaminoethoxy)methane,
    1,1-bis(2-dimethylaminoethoxy)propane, and
    1,1,2,2-tetrakis(2-dimethylaminoethoxy)ethane.
2. The process of claim 1 wherein said amino acetal is bis(2-dimethylaminoethoxy) methane.
3. The process of claim 2 wherein said foam is flexible and said foaming agent comprises water.
4. The process of claim 3 wherein said reaction mixture also comprises an organo-tin compound as a co-catalyst.
5. The process of claim 1 wherein said polyol is a polyether polyol.
6. The process of claim 5 wherein said foam is flexible and said foaming agent is water.
7. The process of claim 6 wherein said polyether polyol is an oxyalkylated polyhydric alcohol or a mixture of oxyalkylated polyhydric alcohols.
8. The process of claim 7 wherein said polyether polyol has a molecular weight of about 2,500 -6,000.
9. The process of claim 8 wherein said organic polyisocyanate is toluene diisocyanate, polymethylene polyphenylisocyanate or a mixture thereof.
10. The process of claim 9 wherein said organic polyisocyanate is toluene diisocyanate.
11. The process of claim 10 wherein said reaction mixture also comprises a metallic co-catalyst.
12. The process of claim 11 wherein said reaction mixture also comprises a surfactant.
13. The process of claim 12 wherein said amino acetal catalyst is bis(2-dimethylaminoethoxy)methane or 1,1-bis (2-dimethylaminoethoxy)ethane.
14. The process of claim 13 wherein said metallic co-catalyst is stannous octoate.
15. The process of claim 14 wherein said polyether polyol is oxypropylated glycerin.
16. The process of claim 15 wherein said amine catalyst is bis(2-dimethylaminoethoxy)methane.
17. The process of claim 15 wherein said amine catalyst is 1,1-bis(2-dimethylaminoethoxy)ethane.

* * * * *